June 16, 1964

W. ZINKIEWICZ 3,137,483

GROUND BURROWING DEVICE

Filed April 16, 1962

INVENTOR
Wiktor Zinkiewicz
BY
ATTORNEYS

June 16, 1964     W. ZINKIEWICZ     3,137,483
GROUND BURROWING DEVICE
Filed April 16, 1962     5 Sheets-Sheet 3

INVENTOR
Wiktor Zinkiewicz
BY
ATTORNEYS

June 16, 1964 W. ZINKIEWICZ 3,137,483
GROUND BURROWING DEVICE
Filed April 16, 1962 5 Sheets-Sheet 4

INVENTOR
Wiktor Zinkiewicz
BY
ATTORNEYS

FIG. 14a  FIG. 14b  FIG. 15

INVENTOR
Wiktor Zinkiewicz
BY
ATTORNEYS

United States Patent Office 3,137,483
Patented June 16, 1964

3,137,483
GROUND BURROWING DEVICE
Wiktor Zinkiewicz, nl. Kujawska 11, Sopot,
Woj. Gdansk, Poland
Filed Apr. 16, 1962, Ser. No. 187,512
5 Claims. (Cl. 262—1)

This invention relates to a device for ground burrowing, moving into the ground under the action of a reciprocatory plunger, or piston, within the device and driven by means of compressed air fed through a flexible hose that connects the device with a compressor or with another source of compressed air, the source being placed outside the burrowing device at a distance from the channel burrowed by it in the ground, the device being adapted to draw behind it, if desired, a rope, a cable or other object.

Known devices of this kind have three principal disadvantages. The plunger, after effecting an advancing stroke, is shifted to its rear starting position under the action of a spiral spring which has been compressed by said stroke. As the action of any spring is uncertain, its application for returning a plunger decreases, in considerable degree, the reliability of the whole device.

The second disadvantage of known devices is the great loss of compressed air during the return movement of the plunger. Finally, the third disadvantage of known devices is the difficulty, and often even impossibility, of removing them from the channel previously made by them, in case of meeting an immovable obstacle.

All these disadvantages are overcome by a device according to this invention wherein forward and backward motions of the plunger within the cylinder of the device are effected solely by compressed air, fed into the device from a distance, by means of control mechanism within the device which controls automatically the influx of the compressed air alternately or periodically into the front and/or the rear internal space of the device, i.e., a chamber in front of, and a chamber to the rear of, the plunger.

Another feature of the invention is a valve chamber within the device which is connected with the inlet of compressed air into the device and communicates with the inner front space and/or inner rear space of the cylinder, and a valve within the valve chamber which is automatically reversed from one of its extreme positions into its other extreme position under the action of the pressure difference in the said valve chamber. The pressure difference is created as a consequence of compressing and expanding air alternately in the internal front and/or internal rear space of the cylinder, said compression and expansion being caused by the reciprocatory motion of the plunger.

According to the invention, the device has an interior front anvil wall which is struck by the reciprocating plunger to advance the device. The device may also have a rear anvil wall to be struck by the reciprocating plunger to retract the device.

Thus, the invention provides a device for ground burrowing, without any movable external driving parts and provided internally with a forward and backward moving piston or plunger, characterized in that each of the spaces of changeable voluble into which the interior of the chamber is divided by the piston, i.e., the chamber in front of, and the chamber to the rear of, the piston, is filled with, and evacuated of, compressed air acting on one or the other side of the piston, or else one of these spaces remains permanently under the action of the compressed air, i.e., in constant communication with the source thereof whereby, in each case, the forward and backward motion of the piston is caused exclusively by the action of the compressed air.

In the first of these aspects of the invention, the device may include two sets of conduits having orifices opening into the cylinder of the device, opened and closed by the reciprocating plunger, and means for opening one set of conduits and closing the other, and vice versa, as hereinafter more fully described, whereby the reciprocating plunger may be caused to strike repeatedly the front anvil wall or the rear anvil wall, according to which sets of conduits are opened and closed by said opening and closing means. The opening and closing means may be a slidable reversing valve positioned in a chamber in the device and optionally shiftable to open and close the conduits as described. This valve is in constant communication with the compressed air supply which acts to moce the valve to one extreme position. The force of the compressed air is opposed by a spring, tending to move the valve to its other extreme position. Thus, by changing the compressed air pressure, the position of the slidable reversing valve may be changed to cause the device to move forward or backward.

The compressed air delivery and outlet conduits may be positioned in the longitudinal wall of the device or in longitudinal ribs upon the device.

A ground burrowing device according to the invention may be adapted for movement through the ground in a curved line by being suitably shaped, as by being bowed longitudinally or by turning the head of the device at a slight angle. Vanes or fins may also be applied externally of the device for this purpose.

To enlarge the burrowed hole in the ground, a suitable jacket may be applied to the rear of the device, and the device may be driven a second time through the hole after it has been formed.

The invention is shown by way of illustration, in the accompanying drawings, in which—

Figure 1:
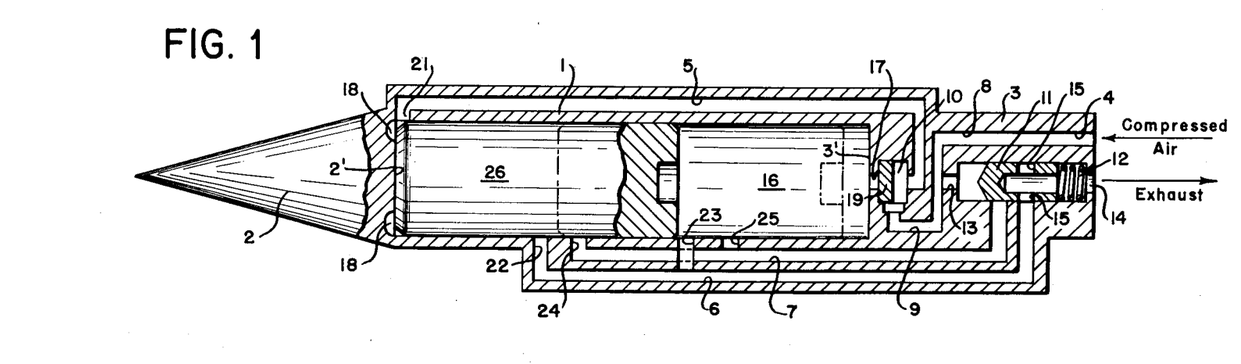
FIG. 1 is a semi-diagrammatic longitudinal mid-section through a device for ground burrowing according to that aspect of the invention adapted to both forward and reverse movement, the longitudinal channels of the device being shown in one plane for simplicity of description and understanding.
Figure 2:
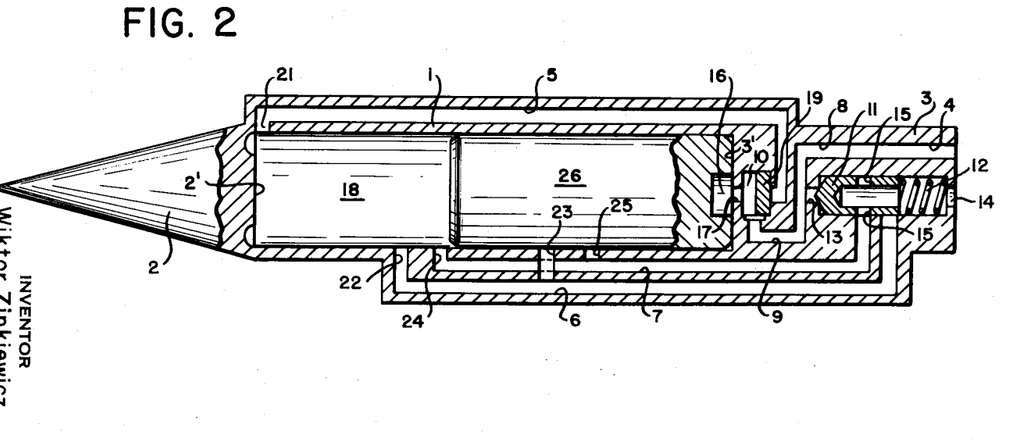
FIG. 2 is a section similar to that illustrated in FIG. 1 showing the movable elements of the device in different position.

The device according to the invention, as shown in FIGS. 1 and 2 is formed as a cylinder 1 closed at its front end prolonged beyond its closed front end to provide a pointed head 2. The rear end of the cylinder 1 is closed by a cylinder-shaped plug 3 which carries a supply conduit 4 by means of which the interior of the cylinder 1 is fed with compressed air from a suitable compressed air source, as a compressor (not shown).

In the illustrated example of the device, the cylinder 1 has three longitudinal conduits 5, 6 and 7 which are bored in its wall or are obtained in another way, for instance by providing suitable hollow ribs passing along its outer wall. Such ribs are not shown in the drawing.

In the plug 3 of the device there is, besides the supply conduit 4, a conduit 8 connected with the supply conduit. The conduit 8 communicates through a conduit 9 with a valve chamber 10, and through a conduit 13 with a longitudinal cavity in which is slidably mounted the sliding element of a reversing valve 11 biased forwardly of the device by the action of a spiral spring 12. The sliding element of the reversing valve 11 moves reciprocally and constitutes an element for the automatic change of the movement of the device according to the invention, forward in a burrowing operation or backward in thhe channel previously burrowed by the deivce in the ground.

The reversing valve 11 serves, on the one hand, for shutting and opening the conduit 13 communicating through the conduit 8 with the supply conduit 4, and on the other hand, for establishing the communication between an outer outlet orifice 14 of the device and either a set of orifices 22 and 23 of the cylinder 1 opened and closed during the forward run of the device, or the set of orifices 24 and 25 of cylinder 1 opened and closed during the backward run of the device. The reversing valve 11 effects the communication between the outer outlet orifice 14 and the individual sets of orifices of the cylinder 1 by means of corresponding longitudinal conduits 6 and 7.

In the reversing valve sliding element 11 which is made in the form of a cylinder closed at one end, there are two or more orifices 15 which are perpendicular to the longitudinal axis of the sliding element and pass through its walls.

In the rear position of the reversing valve sliding element 11 as shown in FIG. 1, the outlet orifice 14 communicating with the atmosphere, communicates through the orifices 15 with the longitudinal conduit 6 serving for the forward motion of the device according to the invention, while the front position of the reversing valve element 11 as shown in FIG. 2, connects the outlet orifices 14 through the orifices 15 with the longitudinal conduit 7 serving for the rearward shift of the device according to the invention.

Figure 3:
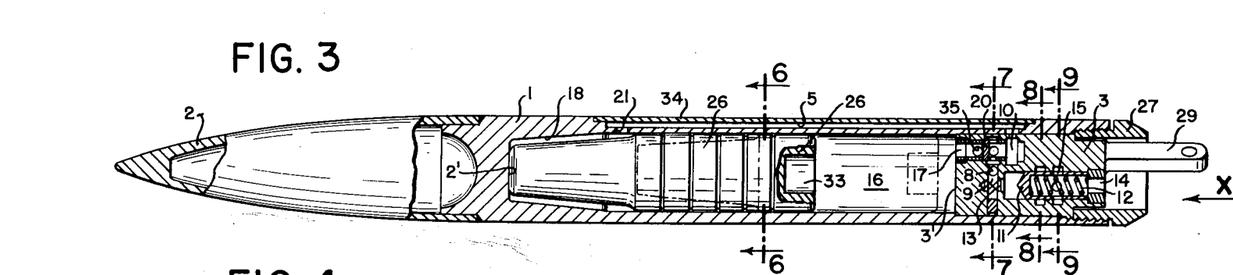
FIG. 3 is a semi-diagrammatic longitudinal mid-section through a different, though similar, form of device for ground burrowing according to the invention, the section being taken along the line 3—3 of FIG. 6.

The valve chamber 10 which is made in the plug 3, and which communicates with the compressed air source through the supply conduit 4 and conduits 8, 9, is connected with the rear space 16 of cylinder 1 through conduit 17, and with the front space 18 of said cylinder— through the longitudinal conduit 5. In the valve chamber 10 there is a valve of any kind, either for instance a plate valve 19, as shown in FIGS. 1 and 2, or for instance a sliding valve 20 as shown in FIG. 3.

It must be mentioned that the construction of the control elements is here stated by way of example only, because also any other known control elements, for instance ball valves, ring valves, etc., may be used.

The cylinder 1 communicates with the above mentioned longitudinal conduits 5, 6 and 7. The cylinder is connected with conduit 5 by means of the orifice 21, with the conduit 6 by means of the set of orifices 22 and 23, and with the conduit 7 by means of the set of orifices 24 and 25.

In the inside of the cylinder 1 a reciprocally actuated plunger 26, serving as a beater, is mounted.

The device according to the invention, schematically shown in FIGS. 1 and 2, operates as follows:

Upon operation of the compressor, set up some distance from the place where the penetration of the device according to the invention will take place, and connected with this device by means of a flexible tube, the compressed air supplied to the supply conduit 4 of the device flows through the conduit 8 and through the conduit 9 into the valve chamber 10.

In the starting position shown in FIG. 1, the plate of valve 19 shuts off the air supply from the rear space 16 of the cylinder 1, whereas it opens the inflow to its front space 18 through conduit 5 and orifice 21. The compressed air entering the front space 18 exercises a pressure upon the front surface of the plunger 26 and causes it to move rearwardly as seen in the drawings.

The plunger 26 when moving rearward, first shuts with its rear end the orifice 23 of the cylinder 1, thereby interrupting communication of the rear space 16 of the cylinder with the outer atmosphere through the longitudinal conduit 6, the orifices 15 of the reversing valve 11 and the outlet orifice 14. At this time, communication between the rear space 16 in the cylinder 1 and the outlet orifice 14 through the orifice 25 and the conduit 7 is then also shut by the reversing valve 11. An increasing compression of the air in the rear space 16 will then take place as the plunger moves rearwardly. In its further backward motion the plunger 26, as it attains the position shown in FIG. 1 in broken lines, opens the orifice 22 of cylinder 1.

Thereupon, the compressed air in the front space 18 of said cylinder begins to flow out violently through the orifice 22 of the cylinder 1, the conduit 6, the orifice 15 in the reversing valve 11 and the outlet orifice 14, causing thereby a pressure drop in the front space 18 of the cylinder and thereby the stoppage of the moving plunger 26 at a certain distance from the surface 3' of the plug 3 without striking upon said surface. Owing to the pressure drop in the cylinder front space 18 which then still communicates with the valve chamber 10, at the same time a difference will arise between the pressure in the front part of the valve chamber 10 connected through conduit 17 with the rear space 16 of the cylinder 1 where the compressed air is then present, and the pressure in its rear part, which is separated from the front one by the plate valve 19.

Due to the difference in pressure between the front part and the rear part of the valve chamber 10, the plate valve 19 is shifted rearwardly into the opposite extreme position, shown in FIG. 2. The change of the position of the plate valve 19 closes off the compressed air inflow through the longitudinal conduit 5 into the front space 18 of cylinder 1, and the compressed air flows through the conduit 17 into the rear space 16 of said cylinder. Thus a pressure is applied upon the rear surface of the plunger 26, whereupon forward motion of the latter takes place.

The plunger 26 when moving forward, shuts with its front edge the set of orifice 22 of cylinder 1 and begins to compress the air in the front space 18 of said cylinder. However, the orifice 22 is placed at such a distance from the front anvil wall 2' of the cylinder that the air compressed between the plunger and the anvil wall as the plunger strikes this wall, is of a very small volume and its compression creates a pressure far from equal to the compressed air pressure acting upon the back face of the plunger. Furthermore, air cushioning forces due to such compression can be minimized by appropriate design of the piston or the compression can be taken up in the front space 18 and the conduit 5 as the plunger strikes the front anvil wall 2'. Thus the plunger strikes the front anvil wall with considerable force, and the device is advanced into the ground with each stroke.

At the same time the rear edge of the plunger 26 opens the orifice 23 of the cylinder, through which orifice the compressed air contained in the rear space 16 of the cylinder begins to flow out violently through the longitudinal conduit 6, the orifice 15 of reversing valve 11 and the outlet orifice 14. In consequence of the pressure difference arising now in the valve chamber 10, between the front and the rear faces of the plate valve 19 said plate is reshifted into its starting position shown in FIG. 1, whereupon the next cycle of movement in the device according to the invention takes place.

It must be noted that the forces acting upon the device when stopping the plunger 26 during its rearward motion because of the compressed air contained in the rear space 16 of cylinder 1, i.e., by means of a so-called "air cushion," and during the forward shift of the plunger caused by the compressed air flowing into the rear space 16 of the cylinder and directed rearward, i.e., in the direction which is opposite to the direction of the forward motion of the device, are less than the friction forces caused by the jamming action of the ground against the pointed head 2 of the device combined with the outside friction forces of the outside surface of the device. Due to such a combination of forces, the rearward motion of the plunger does not cause a withdrawal of the whole device and so there is no hindrance to the systematic forward motion of the device in the ground at each stroke of the plunger 26 upon the front anvil wall 2' of the cylinder 1.

As appears from the above description, FIG. 1 represents the action of the device in which the reversing valve 11 is given the position shown by the suitable chosen pressure of the compressed air supplied by the compressor. Accordingly, the valve 11 automatically shuts the longitudinal rear motion conduit 7 which remains inactive during the whole time of the forward motion of the device itself.

FIG. 2 represents the device after the motion of the plunger has been reversed to effect the backing-out of the device from the burrowed hole. Such a reversing motion is caused by a considerable decrease of pressure of the compressed air supplied by the compressor or other source. Compressed air of a considerably decreased pressure (as one-half the pressure) flowing from the supply conduit 4 through conduits 8 and 13 into the chamber of the reversing valve 11, i.e., into the longitudinal cavity in which it is mounted, is not capable of resisting the pressure of the spiral spring 12 acting upon this valve. Therefore spring 12 moves the reversing valve 11 to the front and shuts by its face the conduit 13. At the same time the reversing valve 11 shuts the longitudinal forward motion conduit 6. Slight pressure changes of the compressed air do not effect reversal of the reversing valve 11 because the section of the conduit 13 which is shut by the face of valve 11, is considerably smaller than the section of the valve itself. For this reason, the force of the compressed air upon the inner face of the valve 11, determined by the section of the orifice 13, at a small increase of the pressure, is unable to overcome the pressure of said spiral spring 12 and cannot shift the reversing valve 11 in opposite direction.

The action of the device according to the invention when reversed to backward motion is analogous to the above described action of such a device during its forward motion.

The difference in the action of the device in both cases resides only in the fact that in consequence of closing, by the reversing valve 11, the longitudinal forward motion conduit 6 and opening the longitudinal backward motion conduit 7, the orifices 22 and 23 of the cylinder 1 are shut while the orifices 24 and 25 are opened. The orifices 24 and 25 are located so that the plunger 26, moving backward and forward in the cylinder, strikes upon the rear anvil surface 3' of the plug 3 of the device and stops before reaching the front surface 2' of the cylinder 1 without striking upon it.

The forces acting in the direction which is opposite to the movement of the whole device when it moves rearwardly along the channel previously burrowed, and arising when the plunger is stopped by the air-cushion formed before the front anvil surface 2' of cylinder 1 and when the piston 26 is shifted backward by the pressure of the compressed air flowing into the front space 18 of cylinder 1, are balanced by the friction of the side surface of the device against the ground.

It must be noted that the forces acting in the opposite direction are in this case considerably weaker than the forces acting in the opposite direction during the forward motion of the device. This is due to the smaller energy of the compressed air supplied under a considerably smaller pressure. The strokes of the plunger 26 upon the rear anvil surface 3' of the plug 3 are also weaker for the same reason, but they are fully sufficient for moving the device backward in the channel previously burrowed because the opposition met by the device is also relatively smaller.

FIGS. 3 to 10 illustrate another embodiment of the invention, based on the above described principle of operation.

Figure 6:
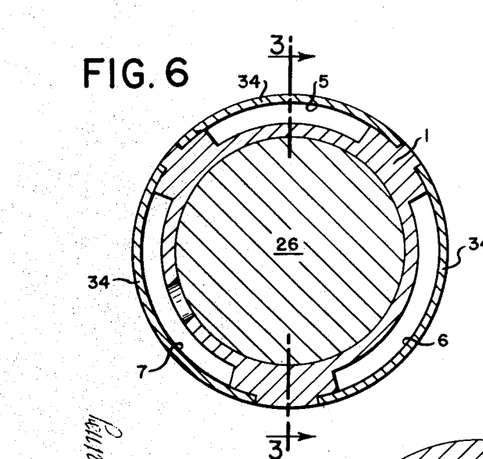
FIG. 6 is a cross-section taken on the line 6—6 of FIG. 3.

As appears from the longitudinal section shown in FIG. 3 and from the cross-section shown in FIG. 6, the device is shaped as a cylinder 1 closed at its front end, to the front end of which is welded a hollow head 2 having a shape like the pointed end of a projectile. The rear part of the cylinder is closed by a cylindrical plug 3 introduced suitably far into the inside bore of the cylinder 1. The plug 3 is held in place by means of a suitable ring nut 27 screwed into a threaded inner aperture of the cylinder 1.

In the inside of the cylinder 1 is mounted a plunger 26 the front of which has the shape of a truncated cone. The size of the cone of the plunger 26 is chosen so that when the plunger strikes the front anvil surface 2', i.e., in its extreme front position shown in FIGS. 3–5, between the outer conical surface of the plunger 26 and the inner conical surface of the front end of the aperture of the cylinder 1 there is a certain interval providing a space 18. To provide a certain space also between the rear surface of the cylindrical part of the plunger 26 and the front of anvil surface 3' of the plug 3 of the device, there is provided on the rear face of the plunger 26 a cylindrical cavity 33.

Within the outer wall of the cylinder 1 three longitudinal conduits 5, 6 and 7 in suitable places and of a suitable length are made which are all shown in the cross-section of the device illustrated by FIG. 6. The conduits 5, 6 and 7 are closed from the outside by arch-shaped covers 34 which are suitably fitted to the outside of cylinder 1 and welded to the same.

Figure 4:
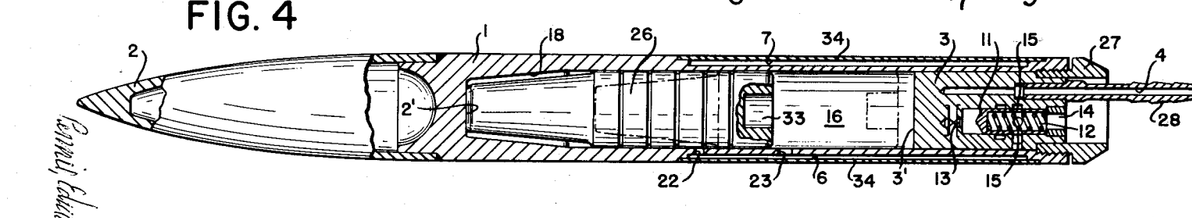
FIG. 4 is a longitudinal section of the device shown in FIG. 3 taken on the line 4—4 of FIG. 9.
Figure 5:
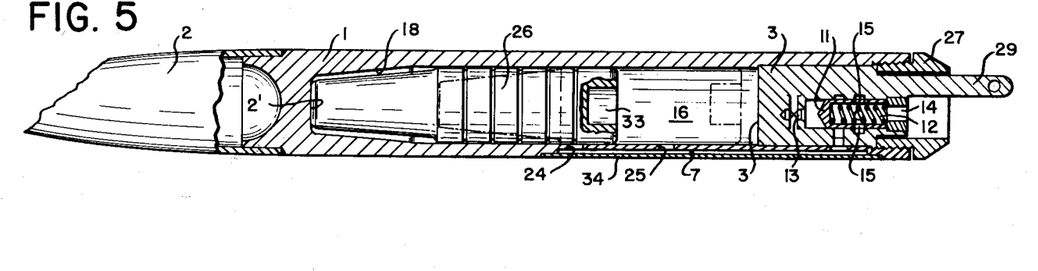
FIG. 5 is a longitudinal section of the device shown in FIGS. 3 and 4 taken on the line 5—5 of FIG. 8.
Figure 9:
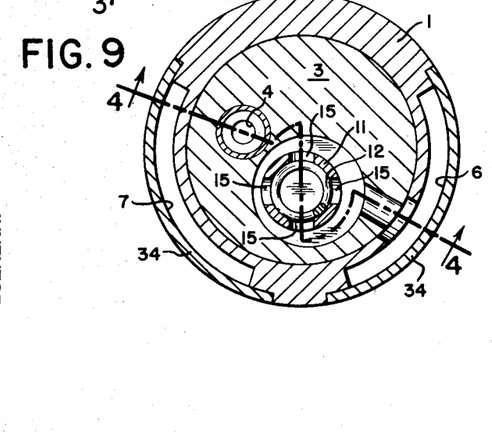
FIG. 9 is a cross-section taken on the line 9—9 of FIG. 3.
Figure 10:
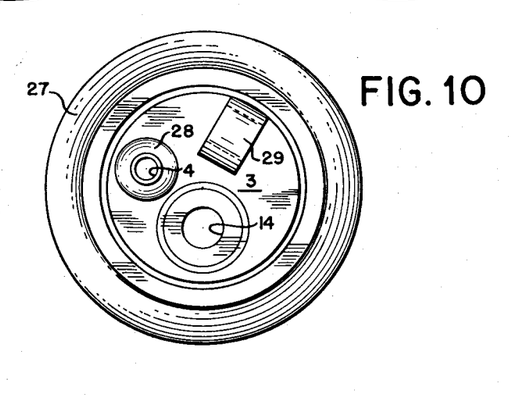
FIG. 10 is a rear view of the device illustrated in FIGS. 3 to 9 looking in the direction of the arrow X shown in FIG. 3.
Figure 11:
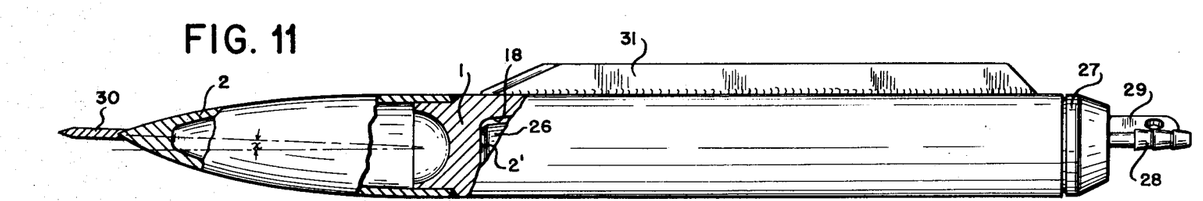
FIG. 11 is a longitudinal side elevation, shown partly in section, of a device similar to that illustrated in FIG. 3, modified for movement along a curved line.
Figure 12:
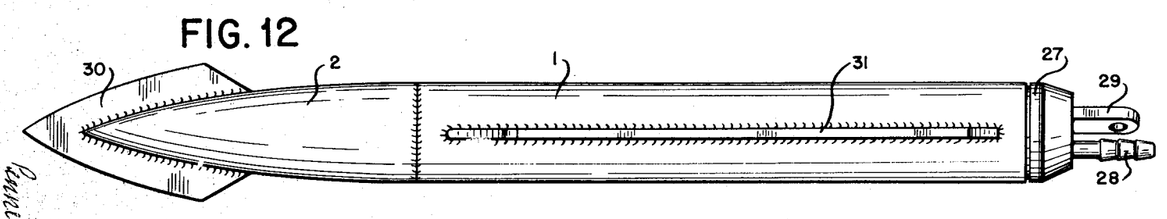
FIG. 12 is an elevation showing in plan view the device illustrated in FIG. 11.

The compressed air is conveyed to the device by a conduit 4 shown in FIG. 4, which is a longitudinal section along on the line F—F in FIG. 9. This conduit 4, having the shape of a cylindrical tube, is screwed into the rear face of the plug 3, and its protruding end 28 is constructed to receiving the end of a flexible hose to supply the compressed air from the compressor.

Figure 7:
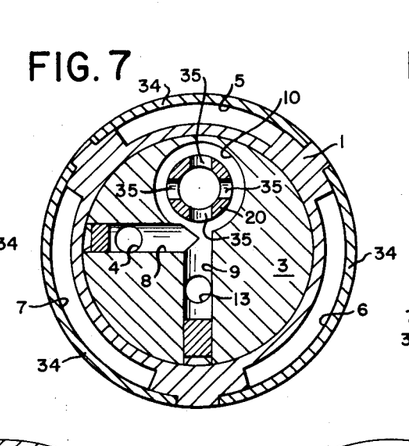
FIG. 7 is a cross-section taken on the line 7—7 of FIG. 3.

In the valve chamber 10 of the plug 3, as seen in FIG. 3 and in FIG. 7, is mounted a slide of valve 20 having the shape of a cylindrical sleeve which is divided by a central partition into two parts—a front and a rear part. Both the front part and the rear part of the sleeve of the slide valve 20, on the one and on the other side of the partition, are provided on the circumference each with four orifices 35. Through these orifices 35 the compressed air, conveyed by the conduit 4, conduit 8 and conduit 9 as well as the ring bore in the inner wall of the valve chamber 10 shown in cross section in FIG. 7, flows into the front or rear part of the cylinder of the slide valve 20, depending upon the position of said valve in the valve chamber 10.

In the moment in which the slide valve 20 is in the position shown in FIG. 3, i.e., when it is shifted to the front, the compressed air flows through the rear orifices 35 into the rear part of the valve chamber 10 and from there through the orifice connecting the said ring bore with the longitudinal conduit 5, into the latter conduit and from there through the orifice 21 into the front space 18 of the cylinder 1.

In the opposite extreme rear position of the slider of valve 20 the compressed air flows through the conduits 4, 8 and 9 to the front orifices 35 of the slider and is then passed into the front part of the valve chamber 10 and from there through the conduit 17—into the rear space 16 of the cylinder 1.

In the plug 3 is also formed a longitudinal cavity in which the reversing valve 11 is mounted. This valve is shown in longitudinal section in FIGS. 3, 4 and 5 and in cross-section—in FIGS. 8 and 9. The reversing valve 11 exercises a small or greater pressure upon the screw spring 12 dependently upon the pressure of the compressed air supplied to the chamber of said reversing valve through conduits 4, 8, 9 and 13. If the pressure of the compressed air supplied by the compressor is suitably chosen and sufficiently high, the reversing valve 11 compresses the spiral spring 12 and moves itself to the rear of the valve chamber, thus connecting, through its four orifices 15 disposed on the circumference of the reversing valve 11, and the central cavity in the chamber of the reversing valve 11, the longitudinal forward motion conduit 6 with the outlet orifice 14.

Figure 8:
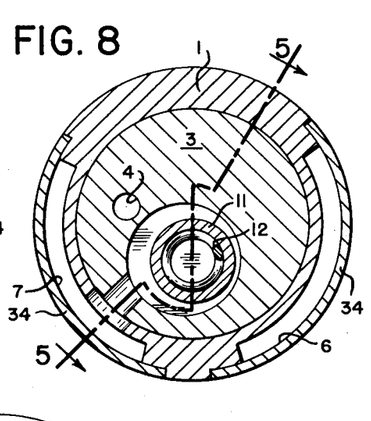
FIG. 8 is a cross-section taken on the line 8—8 of FIG. 3.

At the same time the reversing valve 11 shuts by its longitudinal wall the communication between the longitudinal rearward motion conduit 7 and the outlet orifice 14. The said central cavity in the chamber of the reversing valve 11 is shown in FIGS. 8 and 9. If the pressure of the compressed air is suitably lower (as one-half the pressure), the spiral spring 12 exercising upon the reversing valve 11 a pressure which is greater than the pressure of the compressed air supplied to the opposite side of valve 11, moves the reversing valve 11 into the extreme opposite position. In this way the valve 11 establishes, through the orifices 15, communication between the longitudinal rear motion conduit 7 and the outlet orifice 14. In this position, the body of the reversing valve 11 shuts simultaneously the longitudinal forward motion conduit 6.

The plug 3 closing the cylinder 1 has a prolongation 29 protruding to the outside of the ring-shaped nut 27 and provided with an orifice for fixing a rope thereto. The prolongation 29 is preferably made so as to constitute an integral part of the plug 3.

The operation of the device according to FIGS. 3–12 is identical with that of the device schematically shown in FIGS. 1 and 2.

The device according to the invention may be adapted both to a rectilineal and to a curvilineal motion. To enable the device according to the invention to move along a curvilineal path, for instance along an arch, the device is provided with a head 2 mounted at a certain angle α in relation to the longitudinal axis of the device. The radius of curvature of the path along which the device should move depends upon the greatness of this angle α. The device with such a head is illustrated by way of example in FIGS. 11 and 12.

To facilitate the motion of the device according to the invention along a curvilineal path, it is advisable to fix to the front end of head 2 a suitably shaped ploughshare 30. Moreover, it is advantageous to fix in this case to the cylindrical trunk of the device according to the invention a longitudinal fin 31 (see FIG. 12) preventing the device from being turned about its longitudinal axis while the device is moving along an arc-like path. Advantageously, the device is so constructed that the head 2 is readily replaceable so that heads of various designs may be used interchangeably.

Figure 13:
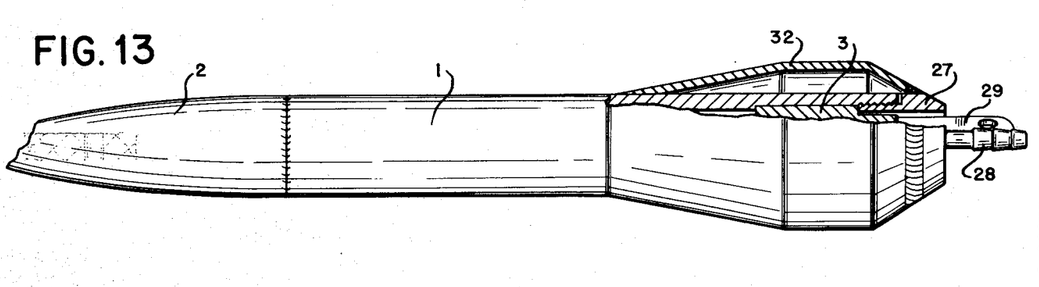
FIG. 13 is a longitudinal side elevation, shown partly in section, illustrating a device according to the invention embodying means for enlarging the channel being formed.

The device according to the invention can also be provided with an additional interchangeable ringshaped nut 27 with a form sleeve 32, shown in FIG. 13, fixed to the device. The sleeve 32 is used for enlarging the channel already burrowed in the ground, by repasisng the device through the previously made channel.

It is to be noted that the cross-section of the cylinder 1 need not have the same diameter along its entire length, but at a certain place or at different places along its length it may be enlarged, e.g., for the purpose of enlarging the diameter of the plug 3. Such an enlargement of the diameter of the plug 3 may sometimes be necessary for a better location of the compressed air supply conduit 4, of the control arrangement or of the exhaust aperture.

It is also to be emphasized that the cylinder 1 of the device according to the invention need not have the shape of a circular cylinder, but may, in some cases, be shaped as a solid of some arbitrary shape, for example, a triangular prism.

Figure 14A:
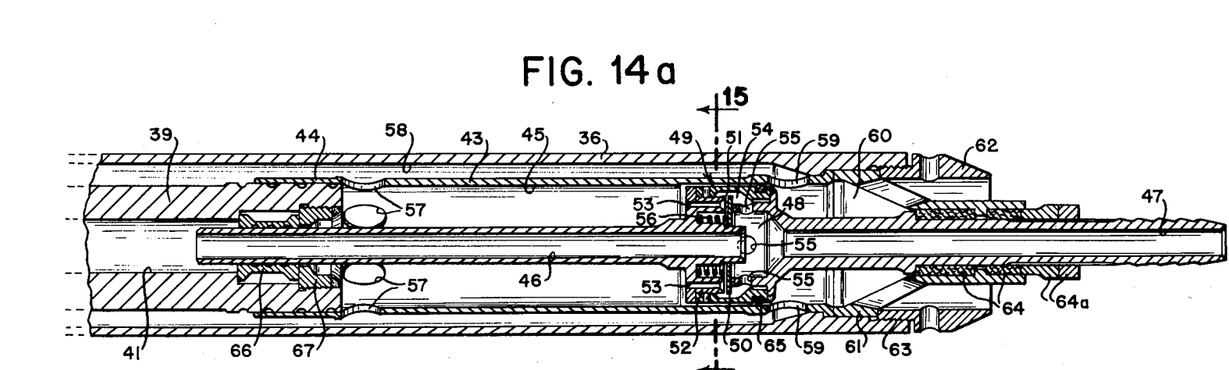
FIGS. 14a and 14b are longitudinal sectional views of the rear portion and front portion, respectively, of a device of my present invention, illustrating particularly that aspect thereof in which a constant pressure of compressed air is maintained in the forward chamber for returning the piston to its rearward position.
Figures 14B, 15:
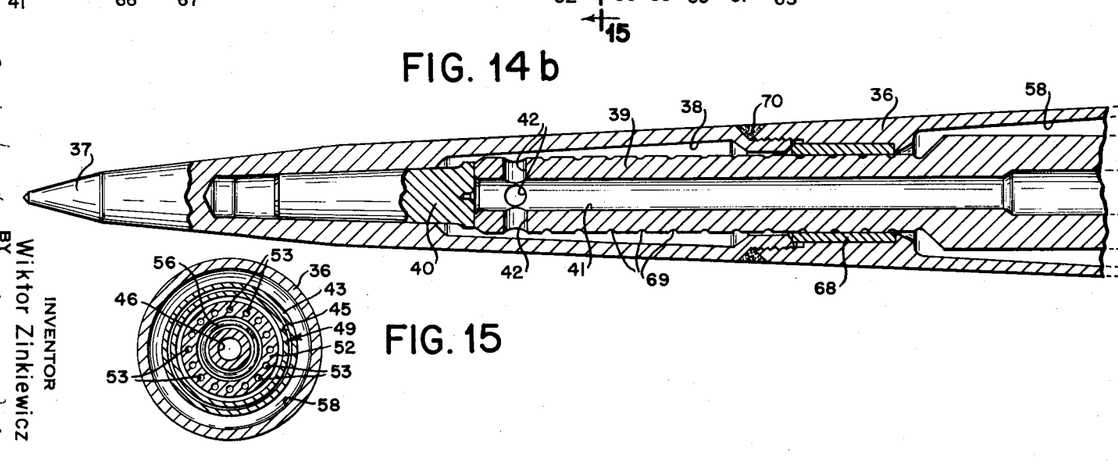
FIG. 15 is a transverse sectional view along the line 15—15 of FIG. 14a and showing the valve arrangement for controlling the inlet of compressed air to the rear chamber.

That aspect of the invention according to which the piston is returned to its rearward position by maintaining the forward chamber continuously under the pressure of the compressed air, through uninterrupted communication with the compressed air source, is illustrated by FIGS. 14a, 14b and 15 of the drawings.

As in the devices previously described, the burrowing device shown in FIGS. 14a, 14b and 15 comprises an outer shell or casing 36 of general circular cross-section, the rearward portion of which is substantially cylindrical, but which is gradually tapered to a pointed nose 37 at its forward end, generally resembling a projectile. Within this outer housing, there is provided a chamber 38 within which there is positioned the piston 39 adapted to move back and forth therein, propelled solely by means of the compressed air.

This particular modification of the device is adapted to advance itself in a forward direction only by reason of the piston striking against the anvil surface 40 positioned in the nose portion of the device. It differs primarily from the previously described aspect of the invention in that no provision is made for exhausting compressed air from the forward chamber during any period of its operation. Throughout the operation, this forward chamber is maintained in open communication with the source of compressed air and consequently the air pressure within the forward chamber is maintained substantially constant, advantageously within the range from about 3½ to about 6 atmospheres.

Obviously, the constant rearwardly-directed forces exerted against the piston by the compressed air in the forward chamber must be substantially less than the forces periodically exerted upon the piston in a forward direction by the compressed air in the rear chamber. This differential in these forces is effected by reducing the effective cross-sectional area of the forward end of the piston relative to the effective cross-sectional area of the rear end of the piston.

In a manner, similar to that previously described, compressed air is intermittently charged to and exhausted from the rear chamber by means of suitable valve mechanism, but there is no exhausting of the compressed air from the forward chamber. Consequently, construction of the device is materially simplified and its efficiency and dependability increased.

The piston 39 is provided with a coaxal duct 41, extending longitudinally therethrough, opening at its forward end into the forward chamber through ports 42 as well as through the extreme forward end of the duct. The purpose of the ports is to maintain open communication between the forward chamber and the duct 41, even when the piston is in contact with the surface of anvil 40.

Coaxially positioned in the rear portion of chamber 38, there is provided a cylindrical sleeve 43. The forward end of said sleeve forms a gas-tight, sliding fit with the rear cylindrical portion of the piston at 44, thus forming the rear chamber 45. Extending coaxially through chamber 45, there is provided a cylindrical duct 46, the forward end of which extends into the duct 41 and is slidably sealed therein to maintain a gas-tight communication between duct 46 and the duct 41 within the piston.

A source of compressed air, not shown, is connected by conventional means, such as a flexible hose, to the compressed air inlet 47 positioned at the rear of the device and leading inwardly to a chamber 48 which is maintained in open communication with the rearward end of duct 46, thus completing the constantly maintained communication between the forward chamber and the source of compressed air.

Positioned between chambers 45 and 48, there is provided a valve, represented generally at 49, adapted to be opened and closed periodically in response to changes in air pressure in the chamber 45. Various types of valves are available for this purpose, as previously noted, but I have used with particular advantage a plate type valve such as shown in the drawing. The particular type of valve shown comprises an annular plate 50 adapted to seat upon the annular shoulder 51 constituting an integral part of the body portion 52 of the valve. Extending through the body portion of the valve, there are a multiplicity of air ducts 53, as more clearly shown in FIG. 15 of the drawings. These air ducts 53 open at their forward end into chamber 45 and at their rearward end open into the annular chamber 54 which is connected, through a plurality of radial orifices 55, and chamber 48.

The annular plate 50 is biased in the open position by means of coil spring 56, the tension of which, alone, is insufficient to maintain the valve in the open position against the force of the compressed air in chambers 48 and 54. However, when aided by the forces of compressed air in chamber 45, exerted through the channels 53 against the valve plate, the plate is moved to the open position.

Adjacent the forward end of the sleeve 43, there are provided six exhaust ports 57 uniformly spaced about the circumference of the sleeve and so positioned longitudinally that they are open when the pistion 39 is in the extreme forward position and permit compressed air within chamber 45 to exhaust in to the exhaust conduit 58 which is maintained in open communication with the atmosphere through the ports 59 and the annular exhaust conduit 60.

The sleeve 43 is securely held coaxially within the device by rear shoulder 61 which fits snugly within the casing and is held in position by means of screw cap 62 which is threaded into the casing at 63 and constitutes the rearward end of the device.

Shock absorbers 64 held in place by nuts 64a are, with advantage, provided between the inlet conduit 47 and cap 62 and an annular air seal ring 65 is provided to form a gas-tight fit between the valve 49 and the sleeve 43. Also, a bushing 66 is provided between the tubular duct-conduit 46 and the rear end of piston 39, this bushing being held in position by means of a nut 67 threaded into the rear end of the piston, as shown.

Also, I have provided a bronze bushing 68 for maintaining an air-tight seal at the rearward end of the forward air chamber and have provided grooves 69 extending about the periphery of the forward portion of the piston to facilitate lubrication.

In the drawing, I have shown the forward end or nose of the device as being threaded and welded to the main body of the casing at 70. However, it may, in some instances, be desirable to omit the welding, so that a different type of nose may be readily substituted.

In operation, assuming that the valve 49 is in the open position and that the piston 39 has moved to the rear closing, by its body, the exhaust port 57, the force of the compressed air is applied against both forward and rear ends of the piston, but since the forward end is of smaller effective area than the rear end, the piston will be driven forward and strike against the anvil 40. As the piston approaches anvil 40, ports 57 are opened thus exhausting compressed air from the rear chamber 45. With the pressure released from chamber 45, the valve 49 is closed, by reason of the higher pressure in chambers 48 and 54.

As the piston proceeds rearwardly, ports 57 are closed by the body of the piston and the reduction in volume of the air in chamber 45 causes an increase in pressure which results in the opening of valve 49 admitting into chamber 45 the compressed air supplied through conduit 47, thus again driving the piston forward.

It will be understood that the embodiment of this aspect of the invention just described is subject to various modifications particularly with respect to means for maintaining the forward chamber of the device in constant open communication with the source of compressed air whereby a substantially uniform air pressure may be maintained in said forward chamber.

Also, the ratio of the effective area of the forward end of the piston to the effective area of the rear end of the piston is subject to considerable variation. I have, for example, obtained excellent results where the effective area of the forward end of the piston was approximately 1½ square inches and the effective area of the rear end of the piston was approximately 4 square inches, the device operating at approximately 450–500 impacts per minute.

This invention is a continuation-in-part of my copending application Ser. No. 782,602 filed December 23, 1958, now abandoned.

I claim:

1. A ground burrowing device having all movable driving elements enclosed therein, said device comprising in combination:
   (a) an elongated outer casing having a tapering forward end to facilitate driving through the ground, said casing housing an elongated chamber;
   (b) a piston reciprocable in said chamber and dividing the said chamber into a rear chamber, and a front chamber, of changeable volume;
   (c) an anvil positioned at one end of the said elongated chamber and adapted to be struck by said piston;
   (d) a compressed air conduit leading from the rear end of said device and adapted to be connected to an extraneous source of compressed air;
   (e) a compressed air duct connecting the compressed air conduit with the chamber of changeable volume in the said one end of the device;
   (f) a compressed air passageway connecting the compressed air conduit with the chamber of changeable volume in the other end of said device;
   (g) valve means within the said passageway adapted to open and close the passageway automatically responsive to changes in the pressure in the last said chamber of changeable volume, the valve being opened by increased pressure in said chamber;
   (h) an exhaust conduit leading from the rear end of said device to the atmosphere; and
   (i) a port connecting said exhaust conduit with the last said chamber of changeable volume and adapted to be opened by the piston as the piston approaches the anvil and to be closed thereby as it moves away from the anvil.

2. A ground burrowing device having all movable driving elements enclosed therein, said device comprising in combination:
   (a) an elongated outer casing having a tapering forward end to facilitate driving through the ground, said casing housing an elongated chamber;
   (b) a piston reciprocable in said chamber and dividing said chamber into a rear chamber, and a front chamber, of changeable volume;

(c) an anvil positioned in the forward end of said elongated chamber and adapted to be struck by said piston;

(d) a compressed air conduit leading from the rear end of said device and adapted to be connected to an extraneous source of compressed air;

(e) a compressed air duct connecting the compressed air conduit with the chamber of changeable volume in the forward end of the device, whereby the chamber may be maintained constantly under the pressure of the compressed air source;

(f) a compressed air passageway connecting the compressed air conduit with the chamber of changeable volume in the rear end of the device;

(g) valve means within the said passageway adapted to open and close the passageway automatically, responsive to changes in pressure in the rear chamber of changeable volume, the valve being opened by increased pressure in said chamber;

(h) an exhaust conduit leading from the rear end of said device to the atmosphere; and (i) a port connecting said exhaust conduit with the rear chamber of changeable volume and adapted to be opened by the piston as the piston approaches the anvil and to be closed thereby as it moves away from the anvil.

3. A ground burrowing device having all movable driving elements enclosed therein, said device comprising in combination:

(a) an elongated outer casing having a tapering forward end to facilitate driving through the ground said casing housing an elongated chamber of circular cross-section;

(b) a tubular duct extending coaxially inwardly into the said chamber from the rear of said device;

(c) a sleeve of greater diameter than the duct tube extending coaxially therewith, the tube and sleeve delineating an elongated annular chamber;

(d) a piston having a duct extending longitudinally therethrough reciprocable in said chamber and of reduced diameter at its forward end and extending at its rear end into said annular chamber and forming a gas-tight sliding fit between the duct tube and the sleeve, the piston at its forward end of reduced diameter forming a gas-type sliding fit with the casing wall at the forward portion of the device;

(e) an anvil positioned in the front end of said cylinder and adapted to be struck by said piston;

(f) a compressed air conduit leading into the rear end of said device and adapted to be connected with an extraneous source of compressed air;

(g) the duct extending longitudinally through said piston being in constant open communication at its rear end through the tubular conduit with said compressed air conduit, whereby the chamber in the forward end of said cylinder is constantly maintained under the pressure of the compressed air source;

(h) a compressed air passageway leading from the compressed air conduit into the annular chamber to the rear of the piston;

(i) valve means in the said passageway adapted to be opened and closed automatically, responsive to changes in pressure within the annular chamber to the rear of the piston, the valve being opened by increased pressure in said chamber;

(j) an exhaust conduit leading from the rear end of said device to the atmosphere;

(k) a port connecting said exhaust conduit with the annular chamber to the rear of the piston and adapted to be opened by the piston as the piston approaches the anvil and to be closed thereby as it moves away from the anvil; and (l) the effective cross-sectional area of the front end of the piston being substantially less than the effective cross-sectional area of the rear end of the piston.

4. A ground burrowing device having all movable driving elements enclosed therein, said device comprising in combination, an elongated outer casing housing an elongated chamber and having a tapering forward end to facilitate driving through the ground, a plunger reciprocable in said chamber, a compressed air connection leading into the rear of said device and adapted to be connected to an extraneous source of compressed air, a front anvil wall in the end of said chamber adjacent its pointed front end and adapted to be struck by said plunger, a rear anvil wall adjacent the opposite end of said chamber adapted to be struck by said plunger, a valve chamber to which said compressed air connection is connected, a pressure conduit extending from said valve chamber to the forward end of the first said chamber, a pressure conduit extending from said valve chamber to the rearward end of the first said chamber, and a valve in said valve chamber adapted to direct the air pressure from said compressed air connection alternately to said pressure conduits to move said plunger forwardly and backwardly in the first said chamber, a first exhaust conduit extending longitudinally of said device from the rear end thereof to an orifice leading to said chamber at a lesser distance from said front anvil wall and a greater distance from said rear anvil wall than the length of said plunger, said first exhaust conduit also being connected to the interior of said chamber through an orifice opening into said chamber at a greater distance from said front anvil wall and a lesser distance from said rear anvil wall than the length of said plunger, a second exhaust conduit extending longitudinally of said device from the rear end thereof to an orifice leading to said chamber at a greater distance from said front anvil wall than the first-named orifice to which said first exhaust conduit extends and at a lesser distance from said front anvil wall and a greater distance from said rear anvil wall than the length of said plunger, said second exhaust conduit also being connected to the interior of said chamber through an orifice leading to said chamber at a greater distance from said front anvil wall than the second-named orifice to which said first exhaust conduit extends and at a greater distance from said front anvil wall and a lesser distance from said rear anvil wall than the length of said plunger, and a reversing valve constructed and arranged to close either exhaust conduit and open the other, whereby when said first exhaust conduit is open and said second exhaust conduit is closed said plunger will repeatedly strike only said front anvil, and when said second exhaust conduit is opened and said first exhaust conduit is closed said plunger will repeatedly strike only said rear anvil.

5. A ground burrowing device according to claim 4, wherein said device has a cavity in its rear end in which said first and second exhaust conduits terminate, and a conduit extending from the compressed air inlet passage into the bottom of the cavity, and wherein said reversing valve is a valve member slidably positioned in the cavity, a spring holds said valve member in position to open said first exhaust conduit and to close said second exhaust conduit, a considerable increase in air supply pressure sliding said valve member in the cavity against the action of said spring to close said first exhaust conduit and open said second exhaust conduit.

References Cited in the file of this patent

UNITED STATES PATENTS

| 1,154,797 | Palmer | Sept. 28, 1915 |
| 1,388,545 | Bohan | Aug. 23, 1921 |

FOREIGN PATENTS

| 166,122 | Great Britain | June 29, 1922 |